UNITED STATES PATENT OFFICE.

JULIUS FRIEDRICH ROSENBACH, OF GÖTTINGEN, GERMANY.

PROCESS OF PREPARING A PREVENTIVE OF TUBERCULOSIS.

939,097. Specification of Letters Patent. Patented Nov. 2, 1909.

No Drawing. Application filed June 14, 1909. Serial No. 502,031.

*To all whom it may concern:*

Be it known that I, JULIUS FRIEDRICH ROSENBACH, privy medical adviser and professor, a subject of the German Emperor, and resident of 15 Theaterstrasse, Göttingen, Germany, have invented certain new and useful Improvements in Processes of Preparing a Preventive of Tuberculosis; and I do hereby declare the following to be a full, clear, and exact description of the invention, such as will enable others skilled in the art to which it appertains to make and use the same.

The present invention relates to a process for producing an effective preparation of tubercular bacillus which, even in relatively large doses, is not toxic or febrific and does not inflame the local tubercular centers, and can therefore be injected into the body even in large quantities without any special precautions, which has not been possible in the case of tuberculin preparations hitherto used.

As determined by Ehrlich's work on diphtheria toxin and antitoxin, (see *Deutsche Medicinische Wochenschrift*, No. 50, Dec. 12, 1901, at page 867,) the toxins present in the diphtheria bouillon cultures consist of a group which he calls the haptophore, by means of which the toxin combines with or fastens to the receptor of the body-cells, and of a toxophore group, which after the combination acts toxically on the cells. Ehrlich further shows that the toxophore group is much more labile than the haptophore group and is therefore more easily destroyed. In proportion as this occurs the diphtheria bouillon culture loses its toxic effect, but nevertheless retains its immunizing effect on the living animal organism and its power of producing antitoxin, unimpaired or only slightly impaired, since it is not the toxophore but only the haptophore group that has this power. Hitherto iodin trichlorid, Lugol's solution, or heating to a more or less high temperature has been used as a means for rendering the toxophore group harmless.

According to the present invention the like effect can be obtained in the case of tubercular bacillus cultures with the aid of trichophyton fungus, more especially trichophyton holosericum album, (compare the book:—*Ueber die Tieferen Eiternden Schimmelerkrankungen der Haut und über deren Ursachen; Beobachtungen und Untersuchungen aus der Göttinger Chirurgischen Poliklinik* von Dr. F. J. Rosenbach, professor in Göttingen. Wiesbaden, Verlag von J. F. Bergmann 1894).

The process of the invention is as follows:—Small particles of a culture of the trichophyton holosericum album are added to tubercular bacillus cultures which have grown for about two months at 37° C. either on potatoes with their lower ends immersed in glycerin-peptone bouillon or on glycerin-peptone bouillon contained in large flasks or in any other manner. At a temperature of about 20–22° C. the fungus develops on the tubercular bacillus cultures which for example have been reared on potatoes. It interpenetrates the cultures within 8 to 12 days and destroys the bacillus in part so that it becomes granular. It also affects the nutrient, however. The tricophyton fungus growing on the nutrient produces chemical substances, which penetrate the entire mass of the nutrient and affect its constituents. This can be shown and proved by the following experiment. The tricophyton fungus growing on an agar nutrient colored red by adding blood, discolors the nutrient not only near the spot, where tricophyton grows, but in the entire mass of the nutrient. The extract obtained from the nutrient contains the efficacious substances formed outside the bacilli and fungus cells (exogen microbia productions). The extract obtained from the separate mass of bacillus and fungus contains the efficacious substances inside those cells (endogen microbia productions.) After lapse of the time named the growth of the fungus is sufficiently advanced. This is recognized by the appearance of a growth of white aerial mycelium of the trichophyton fungus on the bacillus cultures, so thick that the brownish yellow color of the culture can no longer be seen, the surface appearing quite white and velvety. This is true, however, only for those places where the tubercular bacillus culture forms thick deposits on the nutrient. If the aerial mycelium has sufficiently developed on the thick deposits it is not necessary to wait for a like development on the edges of these deposits where the culture has grown only slightly, or on those parts free from the culture, since the mycelium is not easily formed on these generally hard and dry places, whereas the root filaments extend a considerable distance into the nutrient. The culture mass, tubercular bacillus and fungus mycelium, is now removed from the nutrient and worked up apart from the latter. For this purpose the culture mass is ground in a ball mill for 24 hours with about twice its weight of a solution containing 10 per cent. of glycerin and 0.5 per cent. of carbolic acid and twice again with further additions of this solution, after which the whole is filtered free from bacillus.

The filtration is made first by drawing the fluid through simple filterpaper by means of vacuum and then by drawing it in the same manner through a Kieselguhr-filter, Firma Berkefeld, Celle, until the fluid has become perfectly clear.

The filtrate, if necessary, is evaporated in a vacuum at a low temperature, until its volume is from about five times to about twice that of the original culture mass, accordingly as the extract is required to be at low or at high concentration.

The fluid nutrient is absorbed by the pieces of potato and extracted therefrom by means of a solution of glycerin and carbolic acid. The solution is then filtered in the same manner and concentrated as described above.

The extract from the culture mass and that from the nutrient are kept separate in brown flasks, so that each can be used alone or together with the other in certain proportions.

For experimenting on animals and human beings the two extracts (each at the five-fold concentration) are mixed in equal proportions after adding before use an equal volume of a 0.5 per cent. solution of carbolic acid. Of this solution tuberculous guinea-pigs withstood 1 c. c. every other day for months without harm. In experiments on tuberculous men the doses could be increased to 1.5 grams and repeated many times at intervals of 24 hours without the appearance of toxic effect, fever or local inflammation of the tubercular centers.

A guinea-pig infected in the pleura with virulent tubercular bacillus after being really ill for a fortnight was treated from this time onward with subcutaneous injections of the mixture. It lived for six months, while two other animals infected in the same manner and with the same quantities, but not treated with the extract, died of tuberculous pleuritis fourteen days after the infection. The animal that lived six months did not die of tuberculosis, but from a liver disease. The tubercular centers had retrograded and were inclosed in a thick membranous formation. There were no signs of either cheesy formation or pus production. The glands formed hard knots. A guinea-pig infected with tuberculosis by injection in the pit of the stomach was treated with the mixture after lapse of a fortnight. To begin with it still ailed and had swelling of the inguinal glands. While the animal recovered the swellings became gradually smaller and the glands harder. The animal was still alive ten months after the infection, both well and of normal appearance.

I claim:

1. A process of producing a preventive of tuberculosis, which comprises the addition of small particles of trycophyton fungus culture to tubercular bacillus cultures growing on a suitable nutrient, removing the culture mass from the nutrient after the fungus is developed, and then treating the culture mass and nutrient separately to produce the desired product.

2. A process of producing a preventive of tuberculosis, which comprises growing trycophyton fungus on living virulent tubercular bacillus and its nutrient while the bacillus is still on the nutrient, separating the fungus culture from the nutrient, and forming extracts from the nutrient and the fungus culture separately.

3. A process of producing a preventive of tuberculosis, which comprises the addition of small particles of a culture of tricophyton holosericum album to tubercular bacillus cultures growing on a suitable nutrient, removing the resulting culture mass from the nutrient after the fungus is developed, and separating the desired product from both the culture mass and the nutrient.

4. A process for producing a preventive of tuberculosis which process consists in growing trichophyton fungus on living virulent tubercular bacillus and its nutrient while the bacillus is still on the nutrient, then separating the fungus culture from the nutrient, then grinding the fungus culture, then extracting separately the nutrient and the ground fungus culture by a solution of glycerin and carbolic acid, then filtering each solution free of bacteria and if necessary concentrating it in a vacuum.

In testimony whereof I have affixed my signature, in presence of two witnesses.

JULIUS FRIEDRICH ROSENBACH.

Witnesses:
  AUG. REDEKUS,
  LUISE KATHER.